(12) United States Patent
Tabata et al.

(10) Patent No.: US 12,337,645 B2
(45) Date of Patent: Jun. 24, 2025

(54) STRUCTURAL PART

(71) Applicant: NIPPON STEEL CORPORATION, Tokyo (JP)

(72) Inventors: Ryo Tabata, Tokyo (JP); Yasuhiro Ito, Tokyo (JP); Takeshi Kawachi, Tokyo (JP); Masahiro Nakata, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/289,082

(22) PCT Filed: May 20, 2022

(86) PCT No.: PCT/JP2022/021010
§ 371 (c)(1),
(2) Date: Oct. 31, 2023

(87) PCT Pub. No.: WO2022/270188
PCT Pub. Date: Dec. 29, 2022

(65) Prior Publication Data
US 2024/0367470 A1 Nov. 7, 2024

(30) Foreign Application Priority Data
Jun. 22, 2021 (JP) .................... 2021-102875

(51) Int. Cl.
*B60G 7/00* (2006.01)
(52) U.S. Cl.
CPC .......... *B60G 7/001* (2013.01); *B60G 2204/41* (2013.01)

(58) Field of Classification Search
CPC ........ B60G 7/00; B60G 7/02; B60G 2204/41; B60G 7/001
See application file for complete search history.

(56) References Cited

U.S. PATENT DOCUMENTS

| 5,607,177 A | * | 3/1997 | Kato | ...................... | B60G 7/001 |
| | | | | | 280/124.134 |
| 5,992,867 A | * | 11/1999 | Kato | ...................... | B60G 7/001 |
| | | | | | 280/124.134 |

FOREIGN PATENT DOCUMENTS

| DE | 10 2006 013 646 A1 | | 9/2007 |
| JP | 2017007620 A | * | 1/2017 |
| JP | 2017-140859 A | | 8/2017 |
| JP | 2019-162916 A | | 9/2019 |

OTHER PUBLICATIONS

Computer generated English translation of JP2017007620 (Year: 2024).*

* cited by examiner

*Primary Examiner* — Paul N Dickson
*Assistant Examiner* — Tiffany L Webb
(74) *Attorney, Agent, or Firm* — Birch, Stewart, Kolasch & Birch, LLP

(57) ABSTRACT

A structural part includes a part body and a cylindrical bush. The part body includes a through-hole and a cylindrical flange part provided in the periphery of the through-hole. The bush is inserted into the through-hole and the flange part. When seen in a cross section including a central axis of the bush, the flange part has a height difference between a first part that contacts the bush on one side in a direction perpendicular to the central axis and a second part that contacts the bush on the other side.

3 Claims, 4 Drawing Sheets

STRUCTURAL PART

TECHNICAL FIELD

The present disclosure relates to a structural part for an automobile.

BACKGROUND ART

An automobile is composed of a large number of structural parts. The structural parts include chassis parts that form the undercarriage of an automobile. For example, Patent Literature 1 discloses a suspension arm that is one of the chassis parts.

The suspension arm of Patent Literature 1 includes a first arm component member and a second arm component member. The first arm component member and the second arm component member are each formed from a metal plate, and are arranged to face each other. A suspension arm having a hollow structure is formed by welding an edge of the first arm component member and an edge of the second arm component member.

In the suspension arm of Patent Literature 1, a through-hole and a projection protruding toward the second arm component member from the periphery of the through-hole are formed by burring processing in a middle portion of the first arm component member in the longitudinal direction. A through-hole and a projection are formed also in the second arm component member by burring processing so as to correspond to the through-hole and projection of the first arm component member. A bush is press-fitted into the through-hole and projection of the first arm component member, and the through-hole and projection of the second arm component member. The suspension arm is connected to a stabilizer bar via this bush and a ball joint.

CITATION LIST

Patent Literature

Patent Literature 1: Japanese Patent Application Publication No. 2017-140859

SUMMARY OF INVENTION

Technical Problem

Some structural parts for automobiles are connected to other parts or members via a bush as in the suspension arm of Patent Literature 1. A structural part is formed from, for example, a plate. The structural part is provided with a through-hole that penetrates the structural part in a plate thickness direction for attaching a bush.

When load is applied to such a structural part, torsional deformation may occur in a part to which the bush is attached. Particularly, when the structural part is formed to have a thin-wall, since the rigidity of the structural element is decreased, torsional deformation is likely to occur. When torsional deformation occurs in the part of the structural element to which the bush is attached, there is a problem that the part easily buckles, and the yield strength (resistance force) of the structural part with respect to load is decreased.

An object of the present disclosure is to provide a structural part for an automobile that can improve yield strength.

Solution to Problem

A structural part for an automobile according to the present disclosure includes a part body and a cylindrical bush. The part body includes a through-hole and a cylindrical flange part provided in the periphery of the through-hole. The bush is inserted into the through-hole and the flange part. When seen from a cross section including a central axis of the bush, the flange part has a height difference between a first part that contacts the bush on one side in a direction perpendicular to the central axis and a second part that contacts the bush on the other side.

Advantageous Effects of Invention

According to the present disclosure, the yield strength of a structural part for an automobile can be improved.

DESCRIPTION OF EMBODIMENTS

Figure 1:
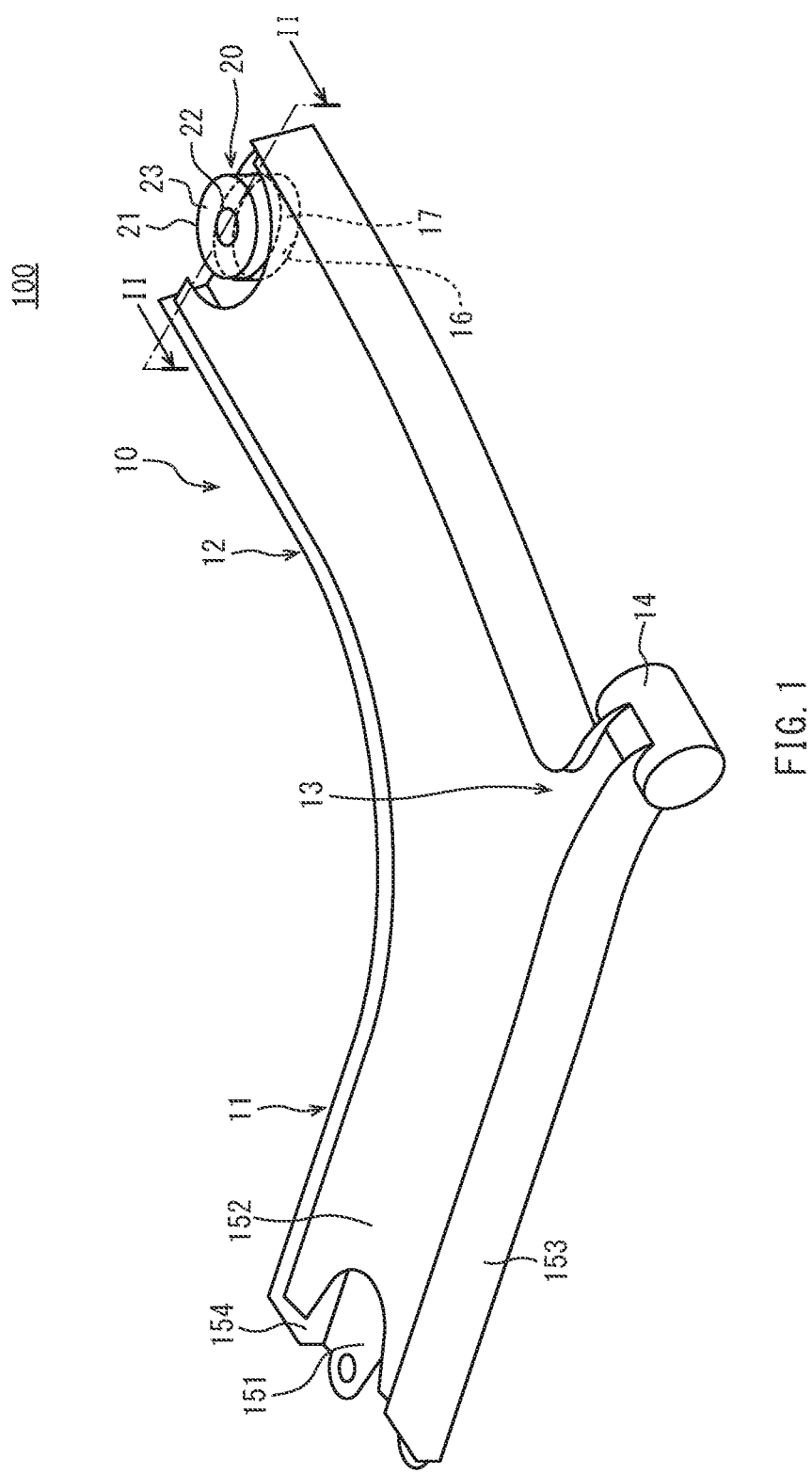
FIG. 1 is a perspective view illustrating the schematic configuration of a structural part for an automobile according to an embodiment.

A structural part for an automobile according to an embodiment includes a part body and a cylindrical bush. The part body includes a through-hole and a cylindrical flange part provided in the periphery of the through-hole. The bush is inserted into the through-hole and the flange part. When seen from a cross section including a central axis of the bush, the flange part has a height difference between a first part that contacts the bush on one side in a direction perpendicular to the central axis and a second part that contacts the bush on the other side (a first configuration).

In the structural part according to the first configuration, the bush is inserted into the through-hole and flange part that are provided in the part body. When seen from a cross section including a central axis of the bush, the flange part has a height difference between the first part that contacts the bush on one side in the direction perpendicular to the central axis and the second part that contacts the bush on the other side. In this case, when load is applied to the structural part, and torsional deformation starts to occur in a part of the part body to which the bush is attached, it becomes easy to restrict the inclination of the bush that occurs in connection with this torsional deformation by the flange part. Thus, the torsional deformation of the part of the part body to which the bush is attached can be suppressed. As a result, buckling is less likely to occur in the part, and the yield strength of the structural part can be improved.

In the above-described structural part, when the height difference in the flange part is x, and the length of the bush in an axial direction is $x_0$, it is preferable that $x/x_0$ is 0.10 or more (a second configuration).

In the second configuration, the height difference x of the flange part is secured to be 0.10 or more times the length (height) $x_0$ of the bush in the axial direction. Accordingly, it is possible to increase the effect of the flange part to restrict the inclination of the bush. Therefore, the torsional deformation of the part of the part body to which the bush is attached can be more easily suppressed. Thus, buckling is less likely to occur in the part, and the yield strength of the structural part can be further improved.

It is more preferable that $x/x_0$ is 0.25 or more (a third configuration).

In the third configuration, the height difference x of the flange part is secured to be 0.25 or more times the height $x_0$ of the bush. Accordingly, it is possible to further increase the effect of the flange part to restrict the inclination of the bush. Therefore, the torsional deformation of the part of the part body to which the bush is attached can be further more easily suppressed. Thus, buckling is further less likely to occur in the part, and the yield strength of the structural part can be further improved.

Hereinafter, an embodiment of the present disclosure will be described with reference to the drawings. In the drawings, the same or corresponding configurations are denoted by the same numerals, and the same description will not be repeated.

[Configuration of Structural Part]

FIG. 1 is a perspective view illustrating the schematic configuration of a structural part 100 for an automobile according to the present embodiment. Although not particularly limited, the structural part 100 is, for example, a chassis part of an automobile. The chassis part includes a suspension arm, such as a lower arm or an upper arm. In the present embodiment, an example will be described in which the structural part 100 is a lower arm.

Referring to FIG. 1, the structural part 100 includes a part body 10 and a bush 20.

(Part Body)

The part body 10 has, for example, a substantially L shape in plan view and bottom view. In the example of the present embodiment, the part body 10 includes arms 11 and 12. The arms 11 and 12 extend in different directions in plan view of the part body 10. In a state where the structural part 100, which is the lower arm, is attached to an automobile, one arm 11 extends generally in a vehicle width direction, and the other arm 12 extends generally in a vehicle length direction (front and back direction).

A front end of the arm 11 is connected to a wheel of the automobile via, for example, a ball joint and a steering knuckle (not illustrated). A front end of the arm 12 is connected to a vehicle body of the automobile via the bush 20. A bent portion 13 between the arm 11 and the arm 12 is also connected to the vehicle body of the automobile via the bush (not illustrated). A cylinder part 14 for inserting the bush is fixed to the bent portion 13.

The part body 10 is formed to be hollow, for example. In the example of the present embodiment, the part body 10 includes a top plate 151, a bottom plate 152, and vertical walls 153 and 154. The top plate 151 is arranged to face the bottom plate 152. The vertical walls 153 and 154 are provided continuously on both side edges of the top plate 151. The vertical walls 153 and 154 are arranged to face each other. The bottom plate 152 is arranged between the vertical walls 153 and 154. The bottom plate 152 is fixed to the vertical walls 153 and 154 by, for example, welding or the like.

The part body 10 further includes a through-hole 16 and a flange part 17 for inserting the bush 20. The through-hole 16 is provided in the top plate 151 in the front end of the arm 12. The through-hole 16 penetrates the top plate 151 in a plate thickness direction. In the example of the present embodiment, the bottom plate 152 is not provided at the position of the through-hole 16. The flange part 17 has a cylindrical shape and is provided in the periphery of the through-hole 16. The flange part 17 protrudes from the periphery of the through-hole 16 to one side of an axial direction of the bush 20. The through-hole 16 and the flange part 17 can be formed in the part body 10 by, for example, burring processing.

The part body 10 is formed from a plate. The part body 10 is typically formed from a metal plate. When forming the part body 10 from a metal plate, the metal plate may be made of, for example, iron (Fe), titanium (Ti), aluminum (Al), magnesium (Mg), or alloys of these.

(Bush)

The bush 20 is inserted into the through-hole 16 and the flange part 17 of the part body 10. The bush 20 is attached to the part body 10 by being inserted into the through-hole 16 and the flange part 17 by, for example, press-fitting. The bush 20 generally has a cylindrical shape. The axial direction of the bush 20 substantially coincides with the plate thickness direction of the part body 10, and more precisely, with the thickness direction of the bottom plate 152. The bush 20 includes an outer cylinder 21, an inner cylinder 22, and an elastic body 23.

An outer peripheral surface of the outer cylinder 21 contacts an inner peripheral surface of the flange part 17 of the part body 10. The inner cylinder 22 is arranged substantially coaxially with the outer cylinder 21 inside the outer cylinder 21. The outer cylinder 21 and the inner cylinder 22 have, for example, substantially cylindrical shapes. However, the outer cylinder 21 and the inner cylinder 22 can also have shapes other than the cylindrical shapes, such as polygonal cylindrical shapes. The elastic bodies 23, such as rubber, is filled between the outer cylinder 21 and the inner cylinder 22.

Figure 2:
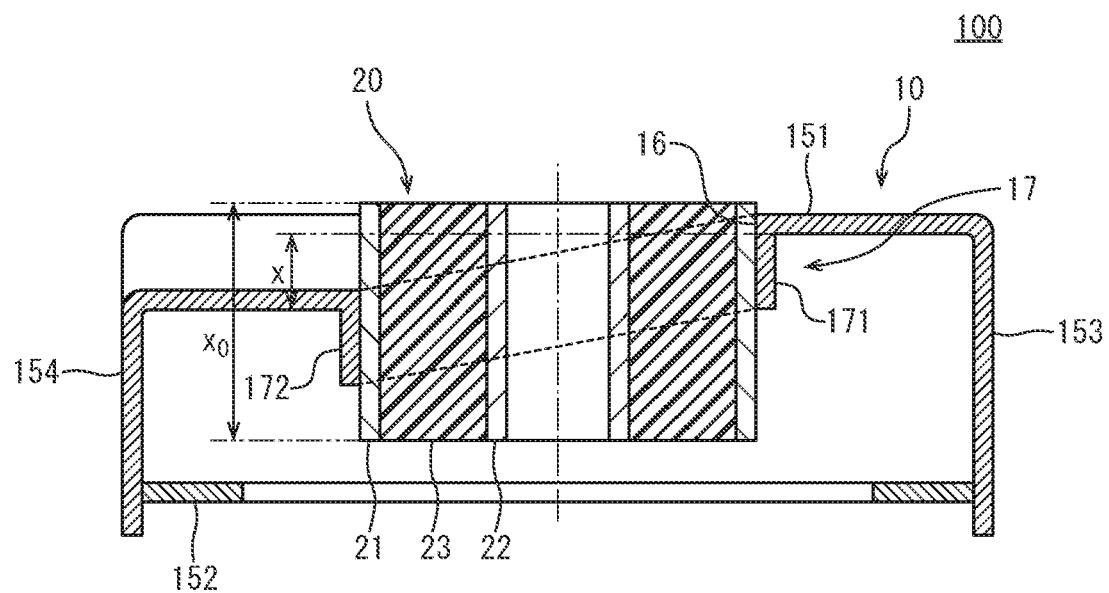
FIG. 2 is a II-II cross-sectional view of the structural part illustrated in FIG. 1.

Hereinafter, the configurations of the bush 20 and its vicinity will be described in detail with reference to FIG. 2. FIG. 2 is a II-II cross-sectional view of the structural part 100 illustrated in FIG. 1. FIG. 2 illustrates a cross section (transverse cross section) that includes the central axis of the bush 20, and that is obtained by cutting the structural part 100 at a plane substantially perpendicular to the extending direction of the arm 12.

As described above, the bush 20 is inserted into the through-hole 16 and the flange part 17 that are provided in the top plate 151 of the part body 10. As indicated by broken lines in FIG. 2, the through-hole 16 and the flange part 17 are inclined with respect to the radial direction of the bush 20. The radial direction of the bush 20 refers to the radial direction of a cylinder that has a common central axis with the outer cylinder 21 of the bush 20. The radial direction of the bush 20 is a direction substantially perpendicular to the central axis of the bush 20 in the cross-sectional view illustrated in FIG. 2.

The flange part 17 includes a first part 171 and a second part 172, when seen in a cross section (axial cross section) including the central axis of the bush 20. The first part 171 is a part that contacts the bush 20 on one side in the radial direction of the bush 20, when the cylindrical flange part 17 is seen in the axial cross section. The second part 172 is a part that contacts the bush 20 on the other side in the radial direction of the bush 20, that is, the opposite side to the first part 171, when the cylindrical flange part 17 is seen in the axial cross section. The flange part 17 has a height difference between the first part 171 and the second part 172 in its axial cross-sectional view. In other words, the first part 171 is arranged to be shifted in the axial direction of the bush 20 with respect to the second part 172, when the structural part 100 is seen in a cross section including the central axis of the bush 20. The top plate 151 of the part body has a height difference at least between a region adjacent to the first part 171 of the flange part 17 and a region adjacent to the second part 172.

On the paper of FIG. 2, the first part 171 is located higher than the second part 172 in the axial cross-sectional view of the flange part 17. Compared with the second part 172, the first part 171 is arranged farther from the bottom plate 152 of the part body 10 in the axial direction of the bush 20. The first part 171 and the second part 172 are parts of the flange part 17 at which the distance difference in the axial direction of the bush 20, that is, the height difference becomes maximum. As indicated by the broken lines in FIG. 2, the first part 171 is smoothly connected to the second part 172. However, a step or the like may be provided between the first part 171 and the second part 172.

When the height difference between the first part 171 and the second part 172 in the flange part 17, that is, the maximum height difference in the flange part 17 is x, and the height of the bush 20 is $x_0$, it is preferable that $x/x_0$ is 0.10 or more, and it is more preferable that $x/x_0$ is 0.25 or more. However, $x/x_0$ is less than 1.00. Although not particularly limited, $x/x_0$ may be 0.50 or less. In the present embodiment, the height difference x is the distance in the axial direction of the bush 20 from a surface (bottom surface) on the bottom plate 152 side of a part of the top plate 151 of the part body 10 to which the first part 171 of the flange part 17 is continuous, to a surface (bottom surface) on the bottom plate 152 side of a part of the top plate 151 to which the second part 172 of the flange part 17 is continuous. The height $x_0$ of the bush 20 is the length in the axial direction of the bush 20, and more specifically, the length of the outer cylinder 21 in the axial direction of the bush 20. The height $x_0$ of the bush 20 is, for example, constant over the entire bush 20.

[Effects]

In the structural part 100 according to the present embodiment, the front end of the arm 12 of the part body 10 is connected to the vehicle body of the automobile via the bush 20. The bush 20 is inserted into the through-hole 16 and the flange part 17 that are provided in the front end of the arm 12. The flange part 17 has the height difference between the first part 171 and the second part 172 in its axial cross-sectional view. In this case, when load is applied to the structural part 100, and torsional deformation starts to occur in the front end of the arm 12 to which the bush 20 is attached, it becomes easy to restrict the inclination of the bush 20 that occurs in connection with this torsional deformation by the flange part 17. Thus, the torsional deformation in the front end of the arm 12 can be suppressed. As a result, buckling is less likely to occur in the front end of the arm 12, and the yield strength of the structural part 100 can be improved.

In the structural part 100 according to the present embodiment, when the height difference between the first part 171 and the second part 172 in the flange part 17 is x, and the height of the bush 20 is $x_0$, it is preferable that $x/x_0$ is 0.10 or more. Accordingly, it is possible to increase the effect of the flange part 17 to restrict the inclination of the bush 20. Therefore, the torsional deformation in the front end of the arm 12 of the part body 10 can be more easily suppressed. Thus, buckling is less likely to occur in the front end of the arm 12, and the yield strength of the structural part 100 can be further improved.

In the structural part 100 according to the present embodiment, it is more preferable that $x/x_0$ is 0.25 or more. Accordingly, it is possible to further increase the effect of the flange part 17 to restrict the inclination of the bush 20. As a result, the torsional deformation in the front end of the arm 12 can be further more easily suppressed. Thus, buckling is further less likely to occur in the front end of the arm 12, and the yield strength of the structural part 100 can be further improved.

Although the embodiment according to the present disclosure has been described above, the present disclosure is not limited to the above-described embodiment, and various modifications can be made as long as the modifications do not depart from the spirit of the present disclosure.

In the above-described embodiment, the flange part 17 of the part body 10 has the maximal height difference x in the cross section that includes the central axis of the bush 20, and that is obtained by cutting at the plane substantially perpendicular to the extending direction of the arm 12. However, the flange part 17 may have the maximal height difference x in a cross section that includes the central axis of the bush 20, and that is obtained by cutting at a plane along the extending direction of the arm 12. Alternatively, the flange part 17 may have the maximal height difference x in a cross section that includes the central axis of the bush 20, and that is obtained by cutting at a plane inclined with respect to the extending direction of the arm 12. The position at which the flange part 17 has the maximal height difference x, that is, the positions of the first part 171 and the second part 172 can be changed appropriately.

Figure 3:
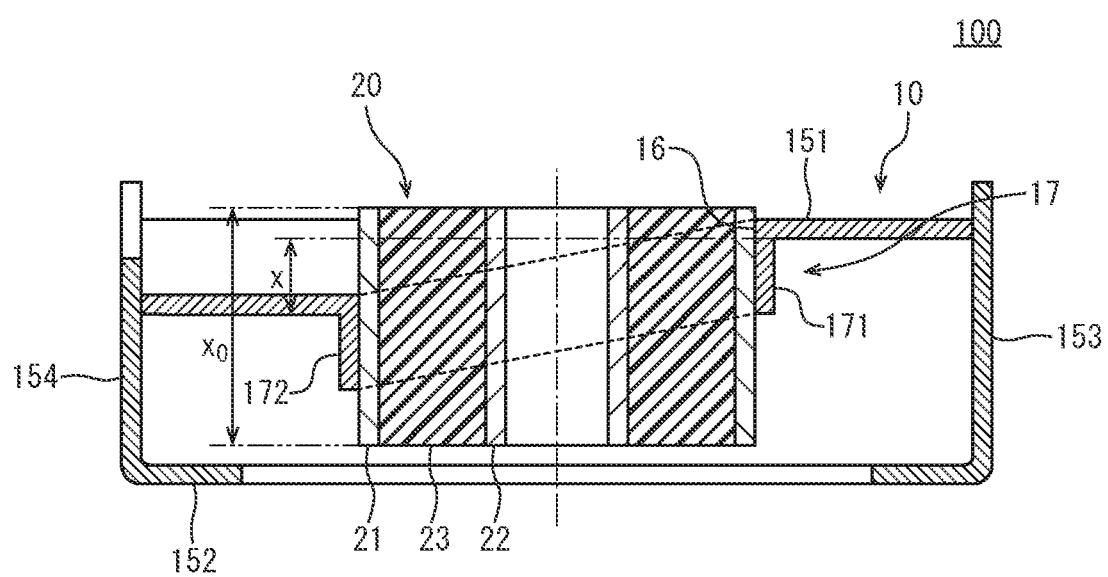
FIG. 3 is a transverse cross-sectional view of the structural part according to a modification of the embodiment.

In the above-described embodiment, the part body 10 includes the top plate 151, the bottom plate 152, and the vertical walls 153 and 154. In the example illustrated in FIG. 2, the top plate 151 and the vertical walls 153 and 154 are integrally formed. However, the configuration of the part body 10 is not limited to this. For example, as illustrated in FIG. 3, in the part body 10, the vertical walls 153 and 154 may be integrally formed with the bottom plate 152.

In the above-described embodiment, the part body 10 has a transverse cross section having a hollow rectangular shape defined by the top plate 151, the bottom plate 152, and the vertical walls 153 and 154. However, the shape of the transverse cross section of the part body 10 is not limited to this. For example, the part body 10 may have a transverse cross section having a substantially U shape defined by the top plate 151 and the vertical walls 153 and 154, or can also have a transverse cross section having a shape other than the substantially U shape. The shape of the transverse cross section of the part body 10 may be the same over almost the entire part body 10, or may be partially different.

EXAMPLES

Hereinafter, the present disclosure will be described in more detail with examples. However, the present disclosure is not limited to the following examples.

In order to confirm the effects of the present disclosure, analysis was performed on the structural part 100 having the shape described in the above-described embodiment, by using a commercially available structure analysis software (LS-DYNA, manufactured by Livermore Software Technology Corporation). In this analysis, the reactive force that occurs in the structural part 100 at the time when a backward force was input was investigated, and was evaluated as backward force load (yield strength).

Figure 4:
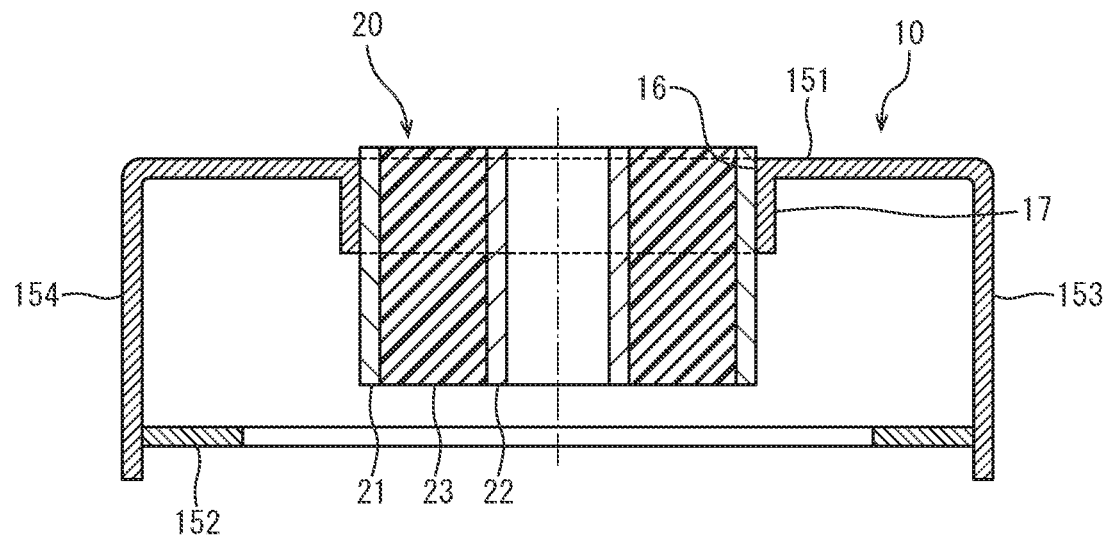
FIG. 4 is a transverse cross-sectional view of the structural part according to Comparative Example.
Figure 5:
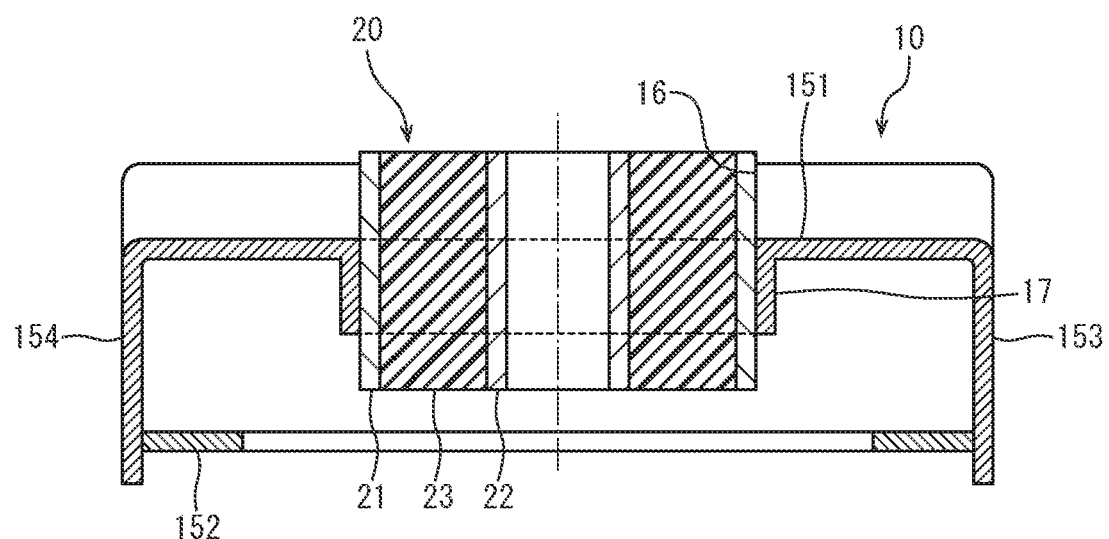
FIG. 5 is a transverse cross-sectional view of the structural part according to another Comparative Example different from FIG. 4.

In this analysis, the influence of the percentage of the height difference x to the height $x_0$ of the bush 20: $x/x_0$ on the backward force load was particularly evaluated, while changing the height difference x of the flange part 17 (Examples 1 to 4). For comparison, the backward force load was also investigated for a structural part that does not have the height difference x in the flange part 17 (Comparative Examples 1 and 2). FIG. 4 illustrates a transverse cross-sectional view of a structural part according to Comparative Example 1, and FIG. 5 illustrates a transverse cross-sectional view of a structural part according to Comparative Example 2. As illustrated in FIG. 4 and FIG. 5, in the structural parts according to Comparative Examples 1 and 2, the through-hole 16 and the flange part 17 of the part body 10 are parallel to the radial direction of the bush 20.

TABLE 1 illustrates the conditions of x and $x_0$ in each Example, and the backward force load in each Example and each Comparative Example.

TABLE 1

| No. | Height Difference x in Flange Part (mm) | Height $x_0$ of Bush (mm) | $x/x_0$ | Backward Force Load (kN) |
|---|---|---|---|---|
| Comparative Example 1 | 0 | 40 | 0.00 | 25.3 |
| Comparative Example 2 | 0 | 40 | 0.00 | 25.4 |
| Example 1 | 20 | 40 | 0.50 | 30.1 |
| Example 2 | 15 | 40 | 0.38 | 29.3 |
| Example 3 | 10 | 40 | 0.25 | 28.2 |
| Example 4 | 5 | 40 | 0.13 | 26.1 |

As illustrated in TABLE 1, in Examples 1 to 4 in which the flange part 17 had a height difference (x>0), the backward force load was improved compared with Comparative Examples 1 and 2 in which the flange part 17 did not have a height difference (x=0). Thus, it can be seen that the backward force load (yield strength) of the structural part 100 can be improved by providing a height difference in the flange part 17.

Figure 6:
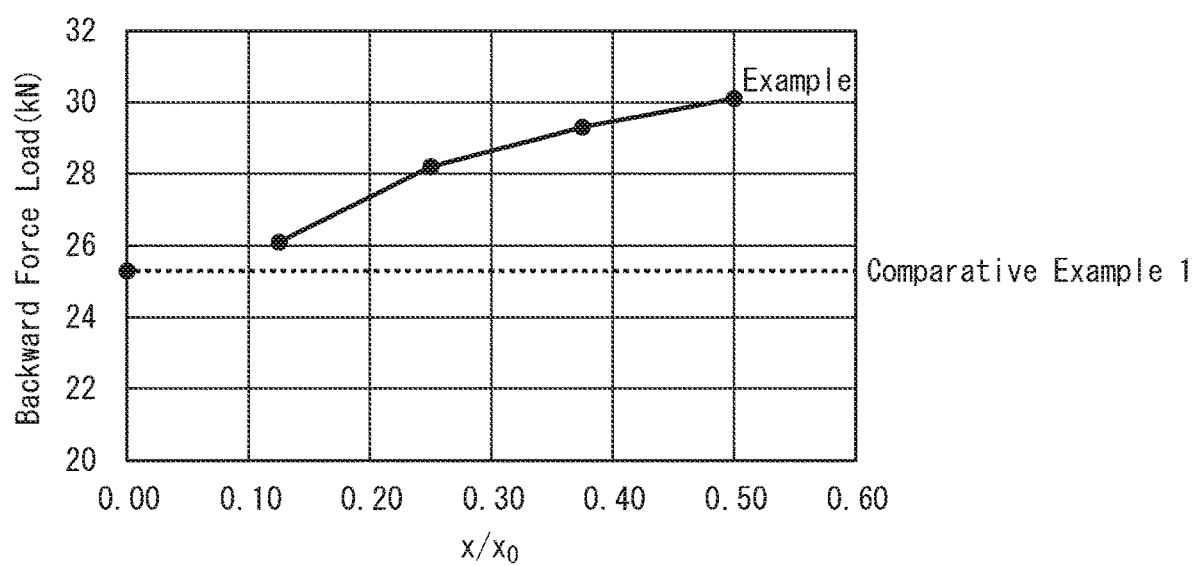
FIG. 6 is a graph that was obtained from an example, and that illustrates the relationship between the percentage of the height difference x of the flange part of a part body to a bush height $x_0$: $x/x_0$, and a backward force load.

FIG. 6 is a graph illustrating the relationship between $x/x_0$ and the backward force load. As illustrated in TABLE 1 and FIG. 6, the larger $x/x_0$, the more improved the backward force load. From TABLE 1 and FIG. 6, it can be seen that the backward force load is clearly improved when $x/x_0$ is 0.10 or more, compared with the cases (Comparative Examples 1 and 2) where $x/x_0$ is 0.00. When $x/x_0$ is 0.25 or more, the backward force load is significantly improved compared with the cases (Comparative Examples 1 and 2) where $x/x_0$ is 0.00. Accordingly, in order to obtain excellent effects for improving the backward force load (yield strength), it is preferable that $x/x_0$ is 0.10 or more, and it is more preferable that $x/x_0$ is 0.25 or more.

REFERENCE SIGNS LIST

100: Structural Part
10: Part Body
16: Through-hole
17: Flange Part
171: First Part
172: Second Part
20: Bush

The invention claimed is:

1. A structural part for an automobile, comprising:
a part body including a through-hole and a cylindrical flange part provided in a periphery of the through-hole; and
a cylindrical bush inserted into the through-hole and the flange part that are provided in a top plate of the part body,
wherein, when seen in a cross section including a central axis of the bush, the flange part has a height difference between a first part that contacts the bush on one side in a direction perpendicular to the central axis and a second part that contacts the bush on the other side and the top plate has a height difference at least between a region adjacent to the first part and a region adjacent to the second part.

2. The structural part according to claim 1,
wherein, when the height difference between the first part and the second part is x, and a length of the bush in an axial direction is $x_0$, $x/x_0$ is 0.10 or more.

3. The structural part according to claim 2,
wherein $x/x_0$ is 0.25 or more.

\* \* \* \* \*